United States Patent
Chen et al.

(10) Patent No.: US 9,184,688 B2
(45) Date of Patent: Nov. 10, 2015

(54) INVERTER DEVICE AND ELECTRIC MOTOR DRIVE SYSTEM

(75) Inventors: Zhenning Chen, Fukuoka (JP); Tomohiro Kawachi, Fukuoka (JP); Mitsunori Kuzushima, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 253 days.

(21) Appl. No.: 13/535,365

(22) Filed: Jun. 28, 2012

(65) Prior Publication Data
US 2013/0009586 A1  Jan. 10, 2013

(30) Foreign Application Priority Data
Jul. 4, 2011  (JP) .................................. 2011-148479

(51) Int. Cl.
H02P 1/16 (2006.01)
H02P 21/04 (2006.01)
H02P 25/18 (2006.01)

(52) U.S. Cl.
CPC .............. *H02P 21/04* (2013.01); *H02P 25/18* (2013.01)

(58) Field of Classification Search
USPC ................................ 318/504, 400.02, 400.11
See application file for complete search history.

(56) References Cited

U.S. PATENT DOCUMENTS

| | | | |
|---|---|---|---|
| 6,847,185 B2* | 1/2005 | Kume et al. | 318/732 |
| 8,183,817 B2* | 5/2012 | Higashikawa et al. | 318/807 |
| 8,269,450 B2* | 9/2012 | Higashikawa et al. | 318/771 |
| 2007/0025478 A1* | 2/2007 | Koga | 375/345 |
| 2009/0021194 A1* | 1/2009 | Tonami et al. | 318/400.02 |
| 2009/0058393 A1* | 3/2009 | Huang | 323/316 |
| 2009/0140674 A1* | 6/2009 | Nakatsugawa et al. | 318/400.02 |
| 2009/0251083 A1* | 10/2009 | Kinpara et al. | 318/400.11 |
| 2011/0025238 A1* | 2/2011 | Ueda et al. | 318/400.02 |
| 2012/0206083 A1* | 8/2012 | Higashikawa et al. | 318/808 |

FOREIGN PATENT DOCUMENTS

| | | | |
|---|---|---|---|
| JP | 08077133 A | * | 3/1996 |
| JP | 2000-236700 | | 8/2000 |
| JP | 2003-088166 | | 3/2003 |
| JP | 2007195334 A | * | 8/2007 |

(Continued)

OTHER PUBLICATIONS

Japanese Office Action for corresponding JP Application No. 2011-148479, Jul. 23, 2013.

(Continued)

*Primary Examiner* — Paul Ip
*Assistant Examiner* — Said Bouziane
(74) *Attorney, Agent, or Firm* — Mori & Ward, LLP

(57) ABSTRACT

An inverter device according to an embodiment includes a constant power controller. The constant power controller computes and outputs, when a value of a voltage reference to an AC motor exceeds a predetermined threshold value, a d-axis current reference correction value on the basis of the value of the voltage reference and the predetermined threshold value. Moreover, the constant power controller generates the d-axis current reference correction value by using a constant power model determined by a torque reference or a speed reference and a supplied direct voltage at an output switching timing determined based on a winding switching signal and outputs the d-axis current reference correction value for a predetermined time.

28 Claims, 8 Drawing Sheets

(56) References Cited

FOREIGN PATENT DOCUMENTS

| | | |
|---|---|---|
| JP | 2010-022165 | 1/2010 |
| JP | 2010022165 A * | 1/2010 |

OTHER PUBLICATIONS

Chinese Office Action for corresponding CN Application No. 201210230243.5, Oct. 8, 2014.

* cited by examiner

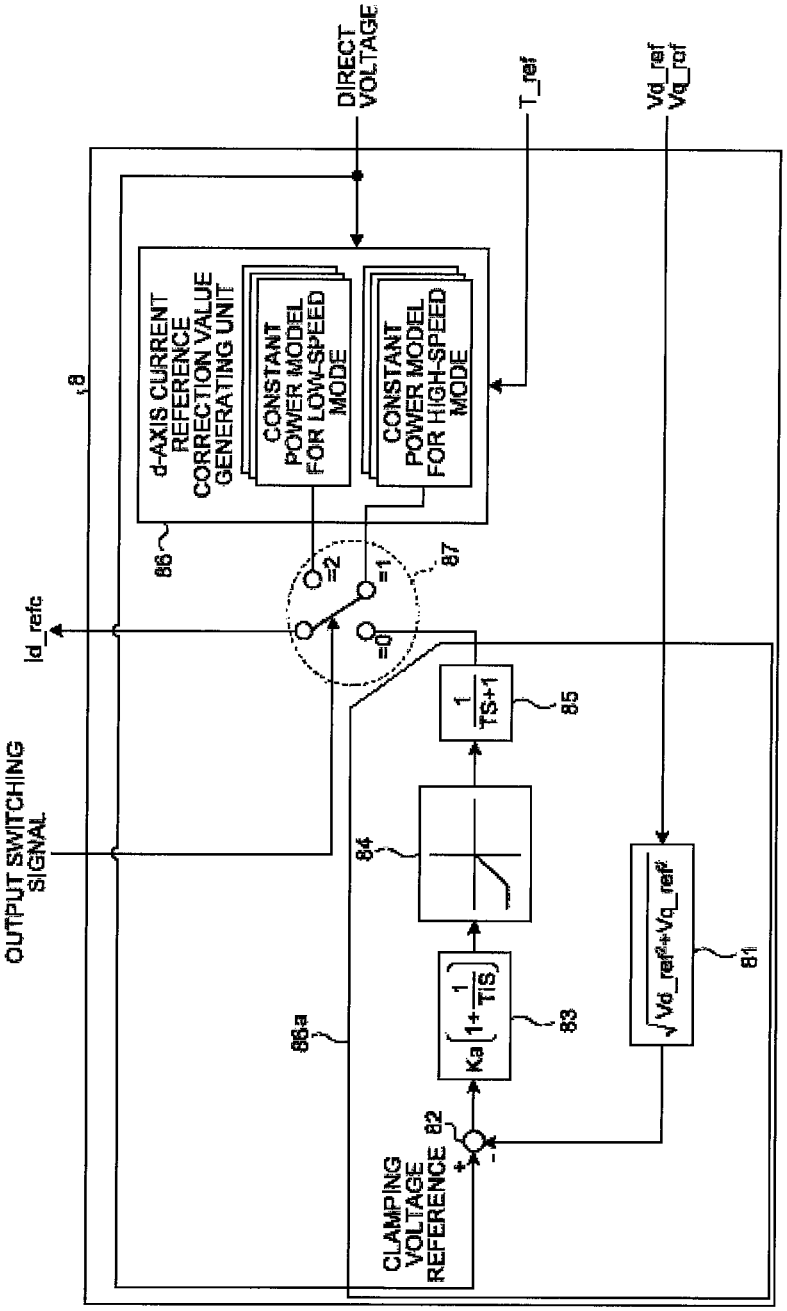

INVERTER DEVICE AND ELECTRIC MOTOR DRIVE SYSTEM

CROSS-REFERENCE TO RELATED APPLICATION

This application is based upon and claims the benefit of priority of the prior Japanese Patent Application No. 2011-148479, filed on Jul. 4, 2011, the entire contents of which are incorporated herein by reference.

FIELD

The embodiment discussed herein is directed to an inverter device and an electric motor drive system.

BACKGROUND

There is known a conventional winding switching method for allowing wide-range operations from a low-speed area to a high-speed area by switching armature windings of an AC (alternating current) motor.

The conventional winding switching method takes measures to prohibit winding switching, for example, in a situation where the number of rotations of the AC motor is suddenly changed, in order to reduce a shock by winding switching. However, such measures have a problem that efficiency is low and further sufficient torque cannot be obtained, for example, when continuous acceleration is performed from a low speed to a high speed.

In this regard, the present applicant has proposed an inverter device that can reduce a shock by winding switching even during acceleration or deceleration, which is disclosed in Japanese Laid-open Patent Publication No. 2010-22165. More specifically, when a voltage reference exceeds the maximum voltage value that can be output to an AC motor, the inverter device disclosed in Japanese Laid-open Patent Publication No. 2010-22165 calculates a d-axis current reference correction value that is a correction value of a d-axis current reference and performs a process for correcting the d-axis current reference by using the calculated d-axis current reference correction value.

At this time, the inverter device disclosed in Japanese Laid-open Patent Publication No. 2010-22165 previously computes a d-axis current reference correction value before winding switching and corrects a d-axis current reference by using the previously computed d-axis current reference correction value at the time of winding switching. As a result, because the calculation delay of the d-axis current reference correction value that is one of generation causes of a shock by winding switching can be removed, the inverter device can perform smooth winding switching even during acceleration or deceleration.

Furthermore, the inverter device disclosed in Japanese Laid-open Patent Publication No. 2010-22165 preliminarily computes a d-axis current reference correction value by using a torque reference, a source voltage value, and a rotational speed of the AC motor as parameters.

However, the inverter device disclosed in Japanese Laid-open Patent Publication No. 2010-22165 has room for improvement in that an influence by winding switching can be further reduced.

For example, the inverter device disclosed in Japanese Laid-open Patent Publication No. 2010-22165 uses the rotational speed of the AC motor as a parameter for determining the d-axis current reference correction value. However, the rotational speed of the AC motor comes under the influence of transient phenomena by winding switching. In other words, there is a possibility that a detection value of the rotational speed of the AC motor includes a noise component caused by transient phenomena by winding switching. When the d-axis current reference correction value is computed by using the detection value that comes under the influence of the transient phenomena, there is a possibility that the resolution time of the transient phenomena is prolonged.

SUMMARY

An inverter device according to an aspect of an embodiment includes: a voltage supply unit, a winding switching signal generator, and a constant power controller. The voltage supply unit is connected to one end of an armature winding of an AC motor corresponding to each phase and supplies a variable voltage for driving the AC motor to the AC motor. The winding switching signal generator is connected to each of another end and a halfway portion of the armature winding and outputs a winding switching signal to a winding switching section that changes connection of the armature winding. The constant power controller computes and outputs, when a value of a voltage reference to the AC motor exceeds a predetermined threshold value, a d-axis current reference correction value on the basis of the value of the voltage reference and the predetermined threshold value. Moreover, the constant power controller generates the d-axis current reference correction value by using a constant power model determined by a torque reference or a speed reference and a supplied direct voltage at an output switching timing determined based on the winding switching signal and outputs the d-axis current reference correction value for a predetermined time.

An electric motor drive system according to an aspect of an embodiment includes a direct voltage source, an AC motor, and an inverter device. The inverter device is connected to one end of an armature winding of the AC motor corresponding to each phase. Moreover, the inverter device includes a winding switching signal generator and a constant power controller. The winding switching signal generator is connected to each of another end and a halfway portion of the armature winding and outputs a winding switching signal to a winding switching section that changes connection of the armature winding. The constant power controller computes and outputs, when a value of a voltage reference to the AC motor exceeds a predetermined threshold value, a d-axis current reference correction value on the basis of the value of the voltage reference and the predetermined threshold value. Moreover, the constant power controller generates the d-axis current reference correction value by using a constant power model determined by a torque reference or a speed reference and a supplied direct voltage at an output switching timing determined based on the winding switching signal and outputs the d-axis current reference correction value for a predetermined time.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 4 is a block diagram illustrating the configuration of a constant power controller;

DESCRIPTION OF EMBODIMENT

Hereinafter, an inverter device and an electric motor drive system (hereinafter, "drive system") according to an embodiment of the present disclosure will be explained in detail with reference to the accompanying drawings. Herein, the same components have the same reference numbers and overlapping explanations are appropriately omitted. In this regard, however, the embodiment disclosed below is not intended to limit the present invention.

The configuration of a drive system 100 according to the present embodiment will be explained with reference to FIG. 1.

Figure 1:
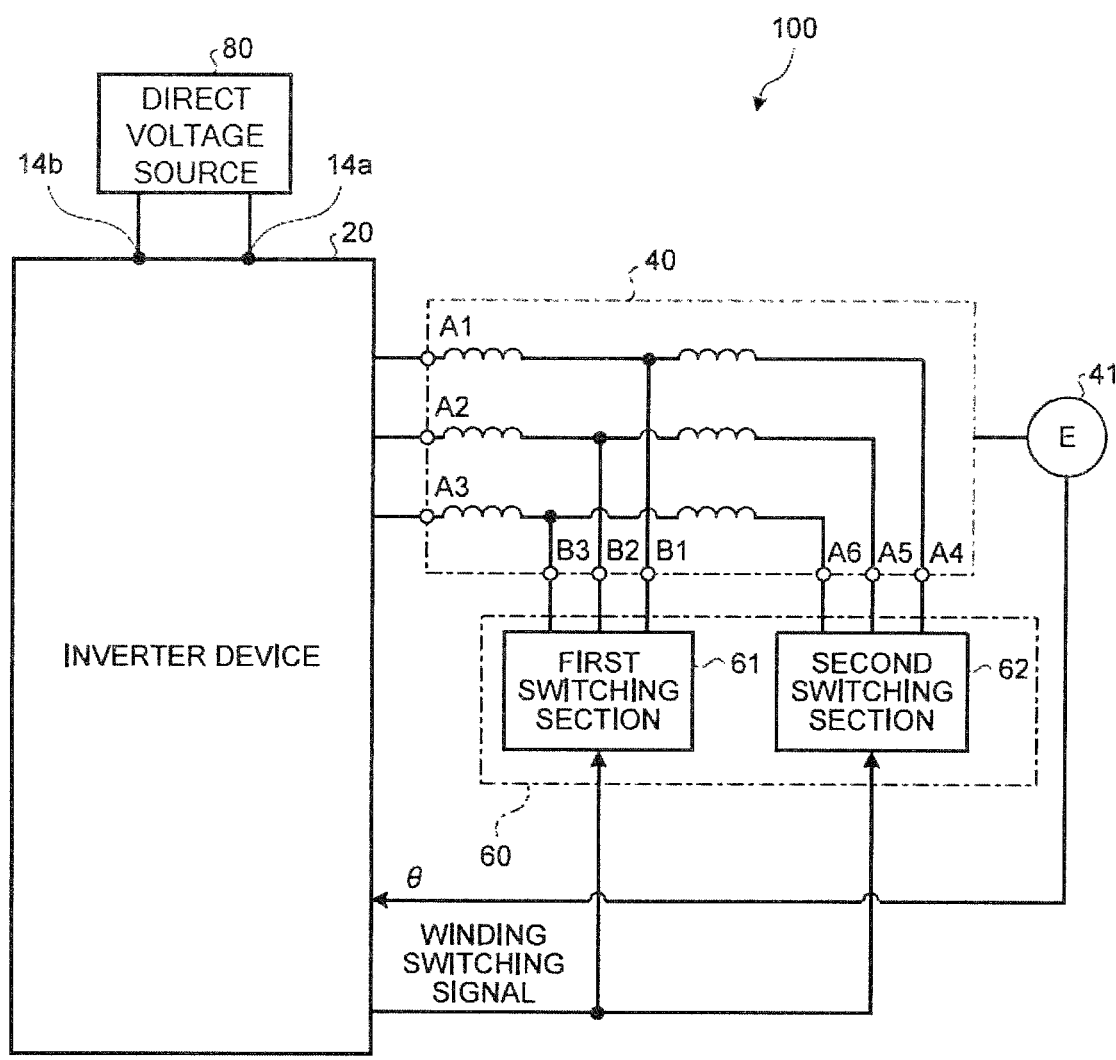
FIG. 1 is a block diagram illustrating the configuration of a drive system according to an embodiment.

As illustrated in FIG. 1, the drive system 100 according to the present embodiment includes an inverter device 20, an AC (alternating current) motor 40, a position detector 41, a winding switching section 60, and a direct voltage source 80.

The inverter device 20 is a power conversion device that converts a DC power supplied from the direct voltage source 80 into three-phase AC powers. The inverter device 20 is connected to connection terminals A1 to A3 that are provided at one ends of armature windings of the AC motor 40 corresponding to the phases. The configuration of the inverter device 20 is explained below with reference to FIG. 2.

The AC motor 40 is a three-phase AC motor that includes armature windings corresponding to three phases of a U phase, a V phase, and a W phase. The AC motor 40 is driven by a voltage output from the inverter device 20. The winding switching section 60 is connected to connection terminals A4 to A6 and connection terminal B1 to B3 of the AC motor 40. The connection terminals A4 to A6 are provided at termination ends of the armature windings corresponding to the phases and the connection terminals B1 to B3 are provided at the halfway portions (herein, middle points) of the armature windings.

The position detector 41 is a detector that is connected to the AC motor 40 and detects a rotor phase θ of the AC motor 40. For example, an encoder or a resolver can be used as the position detector 41.

The direct voltage source 80 includes an AC power source and a rectifier circuit and supplies a DC power to the inverter device 20. For example, a DC power source such as a battery that does not have a rectifier circuit can be also used as the direct voltage source 80.

The winding switching section 60 is a switching section that switches connections of the armature windings corresponding to the phases. Herein, the specific configuration of the winding switching section 60 is explained with reference to FIG. 3.

Configuration Example of Winding Switching Section

Figure 3:
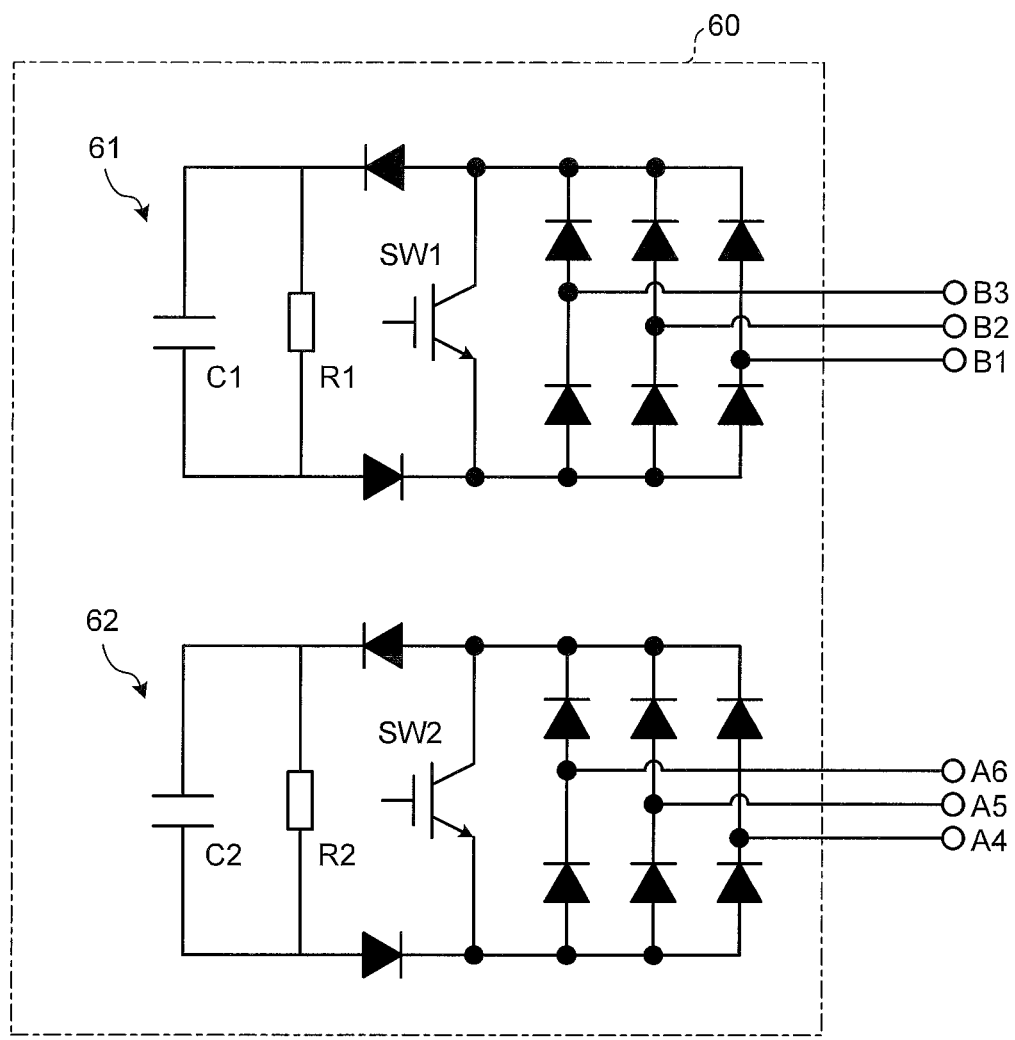
FIG. 3 is a circuit diagram illustrating the configuration of a winding switching section.

FIG. 3 is a circuit diagram illustrating the configuration of the winding switching section 60. The winding switching section 60 includes a first switching section 61 that is connected to the connection terminals B1 to B3 of the AC motor 40 and a second switching section 62 that is connected to the connection terminals A4 to A6 of the AC motor 40. The winding switching section 60 short-circuits the termination ends or the middle points of the armature windings of the AC motor 40 by using the first switching section 61 and the second switching section 62 to switch winding characteristics of the AC motor 40.

The configuration of the winding switching section 60 is basically the same as that of a winding switching section of FIG. 1 disclosed in Japanese Patent No. 3948009. The winding switching section 60 includes capacitors (C1, C2) and resistors (R1, R2) to effectively absorb remaining energy at the time of winding switching. The capacitor C1 and the resistor R1 are provided in the first switching section 61. The capacitor C2 and the resistor R2 are provided in the second switching section 62.

In FIG. 3, when SW1 of the first switching section 61 becomes OFF and SW2 of the second switching section 62 becomes ON in accordance with a winding switching signal to be described below, the termination sides (the connection terminals A4 to A6) of the armature windings are short-circuited and thus winding impedances become the maximum state. This state is referred to as a low-speed mode. In the low-speed mode, it is easy to obtain a large torque. However, as the number of rotations becomes larger, the generation of a torque becomes more difficult. On the other hand, when SW1 becomes ON and SW2 becomes OFF, the middle points (the connection terminals B1 to B3) of the armature windings are short-circuited and thus winding impedances are decreased. This state is referred to as a high-speed mode. In the high-speed mode, because a back electromotive voltage is decreased by decreasing the winding impedances, it can be easy to obtain a torque.

As described above, windings are switched to set SW1 to OFF and SW2 to ON (low-speed mode) during a low speed and are switched to set SW1 to ON and SW2 to OFF (high-speed mode) during a high speed, and thus both of a high torque during a low-speed operation and the generation of torque during a high-speed operation can be satisfied.

Configuration of Inverter Device

Figure 2:
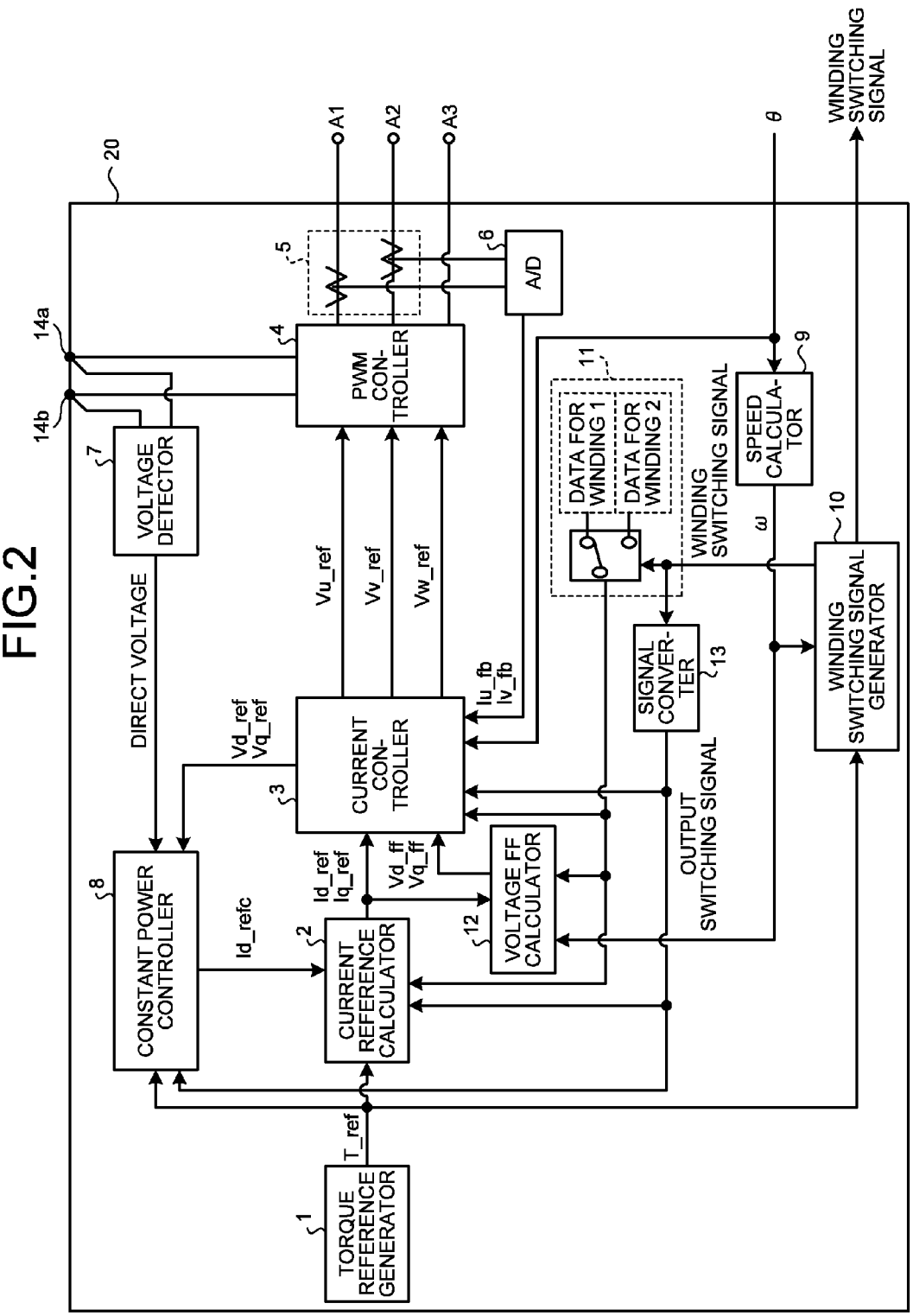
FIG. 2 is a block diagram illustrating the configuration of an inverter device according to the present embodiment.

Next, the configuration of the inverter device 20 according to the present embodiment is explained with reference to FIG. 2. As illustrated in FIG. 2, the inverter device 20 includes a torque reference generator 1, a current reference calculator 2, a current controller 3, a PWM controller 4, a current detector 5, and an A/D converter 6. Furthermore, the inverter device 20 includes a voltage detector 7, a constant power controller 8, a speed calculator 9, a winding switching signal generator 10, a constant number switcher 11, and a voltage FF (feed forward) calculator 12, a signal converter 13, and input terminals 14a and 14b.

The torque reference generator 1 is a processing unit that generates a torque reference T_ref and outputs the torque reference to the current reference calculator 2, the constant power controller 8, and the winding switching signal generator 10. In this case, the torque reference T_ref may be input from an external controller (not illustrated) of the inverter device 20.

The current reference calculator 2 is a processing unit that generates a d-axis current reference Id_ref and a q-axis current reference Iq_ref on the basis of the torque reference T_ref from the torque reference generator 1, a motor constant and a control parameter from the constant number switcher 11, and an output switching signal from the signal converter 13. The current reference calculator 2 outputs the generated d-axis current reference Id_ref and q-axis current reference Iq_ref to the current controller 3 and the voltage FF calculator 12. The configuration of the current reference calculator 2 is explained below with reference to FIG. 7.

The current controller 3 is a processing unit that controls electric currents according to the d-axis current reference Id_ref and the q-axis current reference Iq_ref from the current reference calculator 2 to flow into the AC motor 40 and generates voltage references Vd_ref and Vq_ref. The current controller 3 also performs a process for converting the generated voltage references Vd_ref and Vq_ref into voltage references Vu_ref, Vv_ref, Vw_ref corresponding to the three phases. Then, the current controller 3 outputs the voltage references Vd_ref and Vq_ref to the constant power controller 8 and outputs the voltage references Vu_ref, Vv_ref, Vw_ref to the PWM controller 4. The configuration of the current controller 3 is explained below with reference to FIG. 6.

The PWM controller 4 is a processing unit that performs a PWM control in accordance with a carrier wave signal that is not illustrated and the voltage references Vu_ref, Vv_ref, Vw_ref output from the current controller 3 and supplies a variable voltage with a variable frequency to the AC motor 40. The PWM controller 4 further includes a switching element that is not illustrated. The switching element performs power conversion on the DC power supplied from the direct voltage source 80 and supplies the result to the AC motor 40. As described above, the PWM controller 4 is equivalent to an example of a voltage supply unit that is connected to the one ends of the armature windings of the AC motor 40 corresponding to the phases and supplies a variable voltage for driving the AC motor 40 to the AC motor 40.

The current detector 5 is a detector that detects electric currents flowing into the windings of the AC motor 40. The electric currents detected by the current detector 5 are output to the A/D converter 6.

The A/D converter 6 is a converter that converts the electric currents detected by the current detector 5 into to digital signals. The detection values of the electric currents converted into digital signals by the A/D converter 6 are output to the current controller 3.

The voltage detector 7 is a detector that detects an electric potential of the direct voltage source 80, more specifically, an electric potential difference between the input terminals 14a and 14b of the inverter device 20 to which the direct voltage source 80 is connected. The voltage detector 7 outputs the detected value to the constant power controller 8 as a direct voltage.

When the voltage references (Vd_ref and Vq_ref) from the current controller 3 reaches the maximum voltage that can be output based on the direct voltage from the voltage detector 7, the constant power controller 8 is a processing unit that computes a d-axis current reference correction value Id_refc on the basis of the voltage references and the maximum voltage. The computed d-axis current reference correction value Id_refc is used for a field weakening control. The configuration of the constant power controller 8 is explained below with reference to FIG. 4.

The speed calculator 9 is a calculator that calculates a rotational speed ω of the AC motor 40 on the basis of the rotor phase θ from the position detector 41. The calculated rotational speed ω is output to the winding switching signal generator 10 and the voltage FF calculator 12.

The winding switching signal generator 10 is a processing unit that outputs a winding switching signal to the winding switching section 60 to make the winding switching section 60 execute winding switching. More specifically, the winding switching signal generator 10 determines a winding switching timing in accordance with the rotational speed ω from the speed calculator 9, the torque reference T_ref from the torque reference generator 1, and the like, and outputs the winding switching signal to the winding switching section 60, the constant number switcher 11, and the signal converter 13 at the determined winding switching timing.

For example, when winding switching is performed by using the rotational speed ω as a standard, the winding switching signal generator 10 compares the rotational speed ω from the speed calculator 9 with the set base rotational speed (hereinafter, "winding switching speed"). Then, it is a winding switching timing to a high-speed mode when the rotational speed ω exceeds the winding switching speed and it is a winding switching timing to a low-speed mode when the rotational speed ω falls below the winding switching speed.

In the example, the winding switching signal is a signal for setting SW1 of the first switching section 61 to OFF and SW2 of the second switching section 62 to ON (low-speed mode) if the rotational speed ω falls below the winding switching speed and is a signal for setting SW1 of the first switching section 61 to ON and SW2 of the second switching section 62 to OFF (high-speed mode) if the rotational speed ω exceeds the winding switching speed.

The constant number switcher 11 saves motor constants and control parameters for a low-speed mode (winding 1) and a high-speed mode (winding 2). The constant number switcher 11 outputs the data selected on the basis of the winding switching signal from the winding switching signal generator 10 to the current reference calculator 2, the current controller 3, and the voltage FF calculator 12, and switches the present data to a motor constant and a control parameter that correspond to the winding state of the AC motor 40. The constant number switcher 11 saves, as motor constants and control parameters, a torque-current conversion factor (K), a current phase (β), an armature winding inductance (Ld, Lq), an armature interlinkage flux (Φ), and an armature winding resistance (R), for example.

The voltage FF calculator 12 is a processing unit that computes a d-axis voltage feed-forward value Vd_ff and a q-axis voltage feed-forward value Vq_ff by using the d-axis current reference Id_ref and the q-axis current reference Iq_ref from the current reference calculator 2, the rotational speed ω from the speed calculator 9, and the motor constant and control parameter from the constant number switcher 11.

More specifically, the voltage FF calculator 12 computes the d-axis voltage feed-forward value Vd_ff by using Equation (1-1) and computes the q-axis voltage feed-forward value Vq_ff by using Equation (1-2).

$$Vd\_ff = -\omega \cdot Lq \cdot Iq\_\text{ref} \quad (1\text{-}1)$$

$$Vq\_ff = \omega \cdot Ld \cdot Id\_\text{ref} \quad (1\text{-}2)$$

The d-axis voltage feed-forward value Vd_ff and the q-axis voltage feed-forward value Vq_ff computed by the voltage FF calculator 12 are added to the voltage references calculated by the current controller 3. A current reference response can be improved by performing the process.

The signal converter 13 is a processing unit that converts the winding switching signal from the winding switching signal generator 10 into an output switching signal for switching switches provided in the current reference calculator 2, the current controller 3, and the constant power controller 8.

More specifically, the signal converter 13 outputs, for a predetermined time, an output switching signal, of which the value is "1" at a switching timing from a low-speed mode to a high-speed mode and is "2" at a switching timing from a high-speed mode to a low-speed mode, to the current reference calculator 2, the current controller 3, and the constant power controller 8, on the basis of the winding switching signal from the winding switching signal generator 10. On the other hand, the value of the output switching signal at a timing other than the timings is "0".

The inverter device 20 is configured as described above to drive the AC motor 40 on the basis of the torque reference T_ref.

Because current feedback values (Id_fb and Iq_fb) come under the influence of switching of the armature windings of the AC motor 40, a vibrational component is overlapped on the voltage references (Vd_ref and Vq_ref) feedback-controlled by the current feedback values (Id_fb and Iq_fb). Furthermore, a vibrational component is overlapped on the d-axis current reference correction value Id_refc computed by the voltage references (Vd_ref and Vq_ref) that includes the vibrational component. Therefore, when the AC motor 40 is controlled by using the current feedback values (Id_fb and Iq_fb), the voltage references (Vd_ref and Vq_ref), and the d-axis current reference correction value Id_refc calculated by these signals, the resolution time of transient phenomena by winding switching is further prolonged.

In this regard, the constant power controller 8 according to the present embodiment outputs, for a predetermined time, a d-axis current reference correction value Id_refc generated using a constant power model to be described below, in place of the d-axis current reference correction value Id_refc that may include the vibrational component at the time of winding switching.

It should be noted that the current controller 3 according to the present embodiment does not use the current references (Id_ref and Iq_ref) and the current feedback values (Id_fb and Iq_fb) at the winding switching timing, that is to say, does not perform a current feedback control.

Furthermore, in the present embodiment, a new twist is added to the configuration of the current reference calculator 2 in order to minimize the influence that the current feedback control is not performed.

Figure 6:
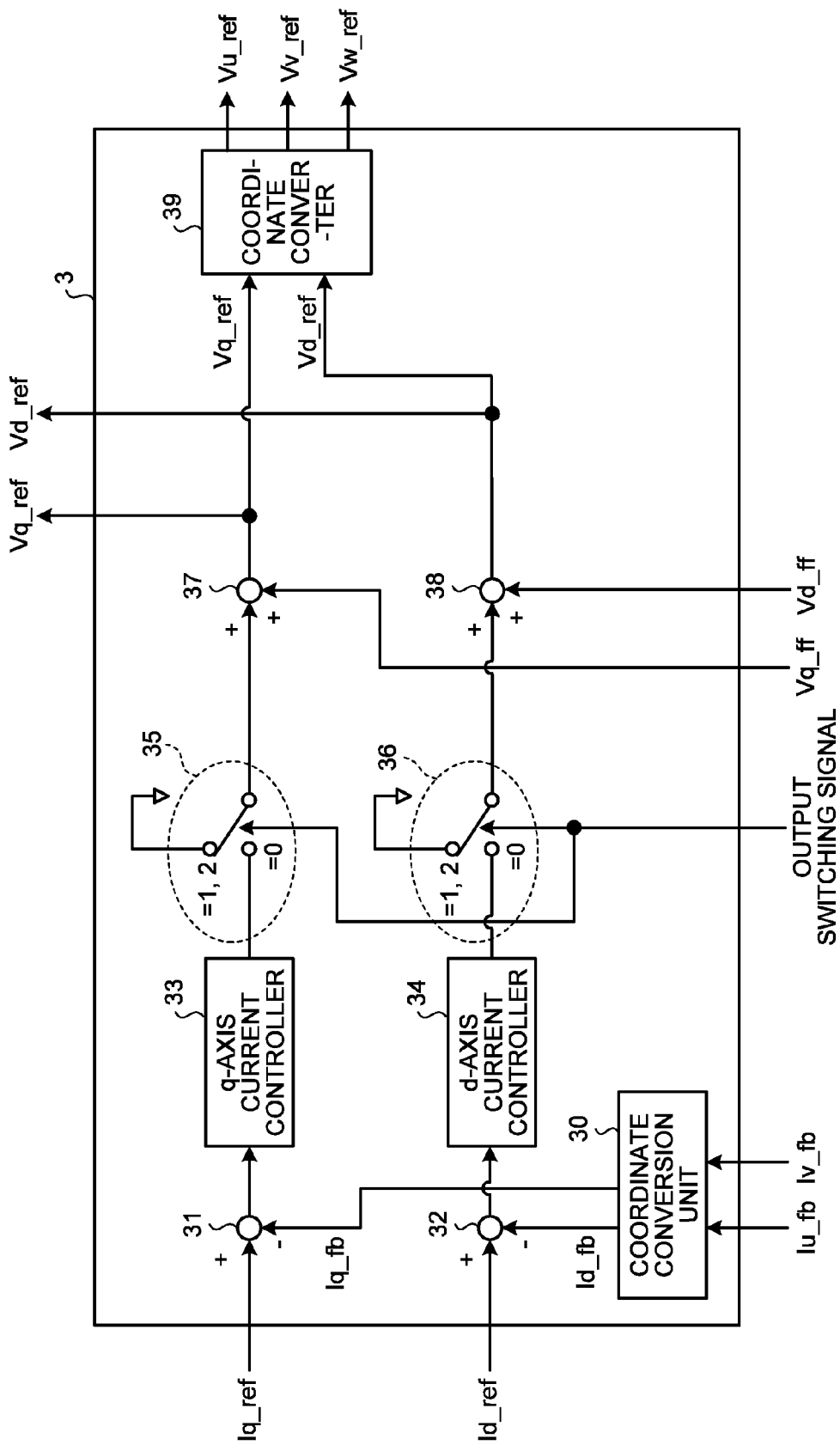
FIG. 6 is a block diagram illustrating the configuration of a current controller.
Figure 7:
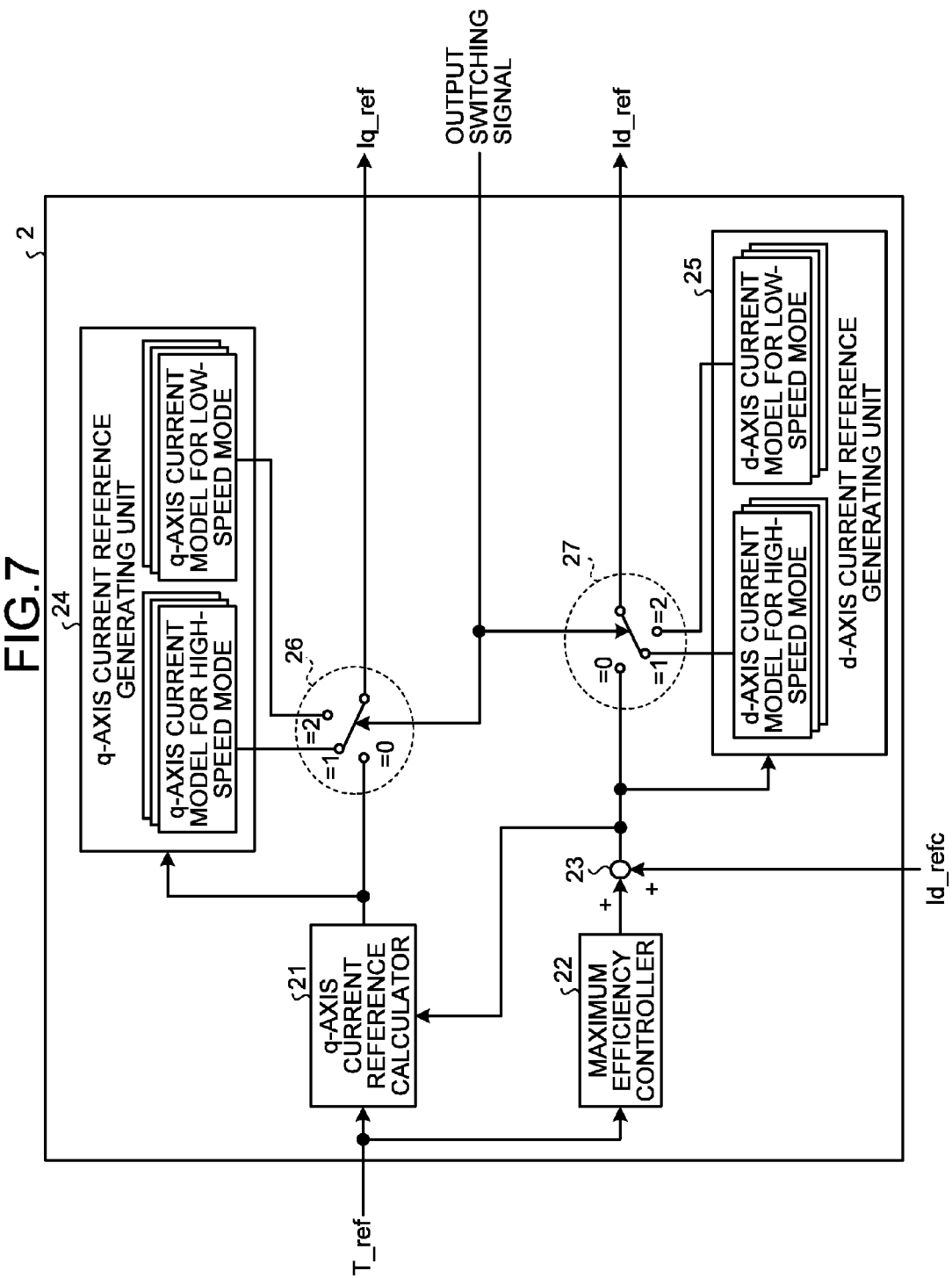
FIG. 7 is a block diagram illustrating the configuration of a current reference calculator.

Hereinafter, the specific configurations of the constant power controller 8, the current controller 3, and the current reference calculator 2 are explained with reference to FIGS. 4, 6, and 7.

Configuration of Constant Power Controller

The configuration of the constant power controller 8 is explained with reference to FIG. 4. FIG. 4 is a block diagram illustrating the configuration of the constant power controller 8. As illustrated in FIG. 4, the constant power controller 8 includes an amplitude calculator 81, a subtractor 82, a PI controller 83, an Id reference limiter 84, a filter 85, a d-axis current reference correction value generating unit 86, and a switch 87.

First, the output of the constant power controller 8 when the output switching signal is "0" will be explained.

The amplitude calculator 81 calculates an amplitude value (voltage amplitude value) of a voltage reference for the AC motor 40 from the d-axis voltage reference Vd_ref and the q-axis voltage reference Vq_ref output from the current controller 3. More specifically, the amplitude calculator 81 computes a voltage magnitude value by using Equation (2) and outputs the computed amplitude value to the subtractor 82 as a voltage feedback value Vfb.

$$Vfb = \sqrt{Vd\_ref^2 + Vq\_ref^2} \quad (2)$$

The subtractor 82 subtracts the voltage feedback value Vfb from a clamping voltage reference and outputs the subtraction result to the PI controller 83. Herein, the clamping voltage reference is the maximum voltage that can be output based on the supplied direct voltage as described above. The clamping voltage reference is determined by the value of the direct voltage from the voltage detector 7, the value obtained by multiplying a coefficient (not illustrated) by the value of the direct voltage, or the like.

The PI controller 83 performs a control including a P control or an I control on the subtraction result by the subtractor 82 to operate so that the voltage feedback value Vfb does not exceed the clamping voltage reference. In order to achieve this object, the Id reference limiter 84 limits the positive output of the PI controller 83 to "0" and the negative output to a predetermined value, and outputs the limited value to the filter 85. The output value of the Id reference limiter 84 is output to the switch 87 via the filter 85 as the d-axis current reference correction value Id_refc.

Next, the output of the constant power controller 8 when the output switching signal is "1" or "2" will be explained.

The d-axis current reference correction value generating unit 86 generates the d-axis current reference correction value Id_refc by using a constant power model determined by the torque reference T_ref from the torque reference generator 1 and the direct voltage from the voltage detector 7. Moreover, the d-axis current reference correction value generating unit 86 separately stores constant power models, which are used at a switching timing from a low-speed mode to a high-speed mode and a switching timing from a high-speed mode to a low-speed mode, and selects a constant power model close to the operating condition of the switching timing from the constant power models. Then, the d-axis current reference correction value generating unit 86 generates the d-axis current reference correction value Id_refc by using the selected constant power model and outputs the generated d-axis current reference correction value Id_refc to the switch 87.

Although it is not illustrated, when the constant power controller 8 has the configuration that the value of the output switching signal is input into the d-axis current reference correction value generating unit 86, it is only necessary that the d-axis current reference correction value generating unit 86 generates the d-axis current reference correction value Id_refc corresponding to one of the low-speed mode and the high-speed mode.

In this way, the generated d-axis current reference correction value Id_refc is output to the switch 87. The switch 87 selects the d-axis current reference correction value Id_refc in accordance with the output switching signal from the signal converter 13. More specifically, the switch 87 selects, as the d-axis current reference correction value Id_refc, the output of the filter 85 if the output switching signal is "0", the output of the constant power model for a high-speed mode if it is "1", and the output of the constant power model for a low-speed mode if it is "2". Then, the selected d-axis current reference correction value Id_refc is output to the current reference calculator 2.

Figure 5A:
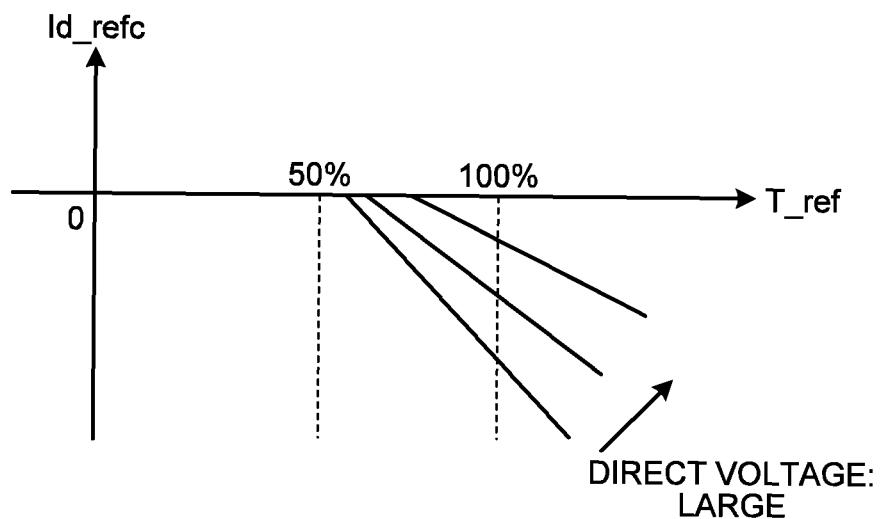
FIG. 5A is a diagram illustrating an example of a constant power model for a high-speed mode.
Figure 5B:
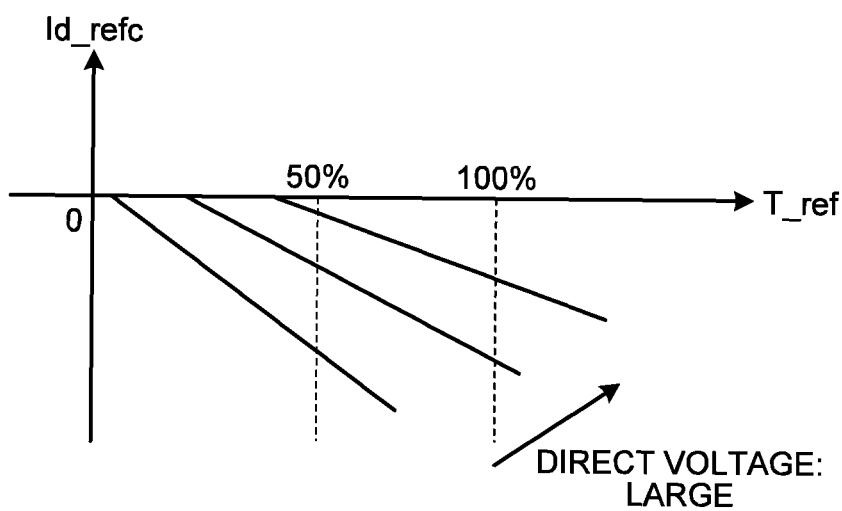
FIG. 5B is a diagram illustrating an example of a constant power model for a low-speed mode.

Next, the constant power models included in the d-axis current reference correction value generating unit 86 are explained with reference to FIGS. 5A and 5B. FIG. 5A is an example of the constant power model for a high-speed mode in which a horizontal axis indicates the torque reference T_ref and a vertical axis indicates the d-axis current reference correction value Id_refc. FIG. 5B is an example of the constant power model for a low-speed mode in which a horizontal axis indicates the torque reference T_ref and a vertical axis indicates the d-axis current reference correction value Id_refc.

Because the low-speed mode and the high-speed mode of the AC motor 40 have different motor constants and control parameters accompanied with them, the sizes of the voltage references (Vd_ref and Vq_ref) are different even if load conditions are the same, and thus the difference has an influence on the size of the torque reference T_ref. Moreover, from the viewpoint of the field weakening control described above, the d-axis current reference correction value Id_refc to be corrected is dependent on the size of the direct voltage.

For this reason, the d-axis current reference correction value Id_refc has different values even if the torque reference T_ref is the same value in accordance with the size of the direct voltage as illustrated in FIGS. 5A and 5B. For this reason, the d-axis current reference correction value generating unit 86 is configured to have a plurality of models for each of the high-speed mode and the low-speed mode.

In FIGS. 5A and 5B, the constant power model is not a function of the rotational speed ω. This reason is that winding switching is performed on the basis of the rotational speed ω of the AC motor 40 and a change in speed is minute at the switching timing. Herein, if the inverter device has a configuration that the winding switching speed can be variable or winding switching is performed on the basis of the torque reference T_ref, a function that uses a speed as a parameter may be prepared for the constant power model and be saved in the d-axis current reference correction value generating unit 86. Furthermore, this is similar to the case where the change in speed at the switching timing is not minute.

In FIGS. 5A and 5B, it has been explained that the constant power models are indicated by a function that uses the torque reference T_ref and the direct voltage as parameters. However, the d-axis current reference correction value generating unit 86 may save therein the constant power models that are numeric tables or the other formats, or may generate the d-axis current reference correction value Id_refc by simplifying internal models and performing interpolation approximation.

In this way, the constant power controller 8 can output the d-axis current reference correction value Id_refc, which does not include a vibrational component accompanied with winding switching, to the current reference calculator 2 even at the timing of winding switching. Therefore, the increase of the resolution time of transient phenomena by winding switching can be prevented.

Configuration of Current Controller

Next, the configuration of the current controller 3 is explained with reference to FIG. 6. FIG. 6 is a block diagram illustrating the configuration of the current controller 3. As illustrated in FIG. 6, the current controller 3 includes a coordinate conversion unit 30, subtractors 31 and 32, a q-axis current controller 33, a d-axis current controller 34, switches 35 and 36, adders 37 and 38, and a coordinate converter 39.

The coordinate conversion unit 30 performs coordinate conversion of detection values Iu_fb and Iv_fb of the current detector 5 output from the A/D converter 6 by using the phase 8 of the rotor, and generates the current feedback values (Id_fb and Iq_fb).

The subtractor 31 is a processing unit that subtracts the q-axis current feedback value Iq_fb from the q-axis current reference Iq_ref output from the current reference calculator 2 and outputs the subtraction result to the q-axis current controller 33. The subtractor 32 is a processing unit that subtracts the d-axis current feedback value Id_fb from the d-axis current reference Id_ref output from the current reference calculator 2 and outputs the subtraction result to the d-axis current controller 34.

The q-axis current controller 33 and the d-axis current controller 34 are controllers that respectively perform control in such a manner that the subtraction results by the subtractor 31 and the subtractor 32 become zero.

The switches 35 and 36 are processing units that respectively select whether the outputs of the q-axis current controller 33 and the d-axis current controller 34 are used in accordance with the output switching signal from the signal converter 13. More specifically, the switches 35 and 36 respectively output the outputs of the q-axis current controller 33 and the d-axis current controller 34 to the adders 37 and 38 if the output switching signal is "0", and outputs, to the adders 37 and 38, "0" instead of the outputs of the q-axis current controller 33 and the d-axis current controller 34 if the output switching signal is "1" or "2".

The adder 37 adds the output of the switch 35 to the q-axis voltage feed-forward value Vq_ff from the voltage FF calculator 12. The adder 38 adds the output of the switch 36 to the d-axis voltage feed-forward value Vd_ff from the voltage FF calculator 12. The addition results are output to the coordinate converter 39 and the constant power controller 8 as the voltage references (Vd_ref and Vq_ref).

The coordinate converter 39 is a processing unit that converts the voltage references (Vd_ref and Vq_ref) into to U-phase, V-phase, and W-phase voltage references Vu_ref, Vv_ref, Vw_ref on the basis of the phase θ of the rotor. The coordinate converter 39 outputs the converted voltage references Vu_ref, Vv_ref, Vw_ref to the PWM controller 4.

As described above, the current controller 3 uses the voltage feed-forward values (Vd_ff, Vq_ff) from the voltage FF calculator 12 as the voltage references (Vd_ref and Vq_ref) without using the outputs of the d-axis current controller 34 and the q-axis current controller 33 performed by using the current feedback values (Id_fb and Iq_fb) when winding switching is performed.

In other words, because the current controller 3 generates the voltage references (Vd_ref and Vq_ref) without using the output of the feedback control that has a possibility that a vibrational component accompanied with winding switching is overlapped, the increase of the resolution time of transient phenomena by winding switching can be more surely prevented.

The current controller 3 also performs a process for initializing integral elements included in the q-axis current controller 33 and the d-axis current controller 34 when the output switching signal is "1" or "2". As a result, when the output switching signal is again switched to "0", the generation of the inappropriate voltage references (Vd_ref and Vq_ref) can be prevented by the integral elements remaining in the q-axis current controller 33 and the d-axis current controller 34.

Configuration of Current Reference Calculator

Next, the configuration of the current reference calculator 2 is explained with reference to FIG. 7. FIG. 7 is a block diagram illustrating the configuration of the current reference calculator 2. As illustrated in FIG. 7, the current reference calculator 2 includes a q-axis current reference calculator 21, a maximum efficiency controller 22, an adder 23, a q-axis current reference generating unit 24, a d-axis current reference generating unit 25, and switches 26 and 27.

The q-axis current reference calculator 21 is a processing unit that computes the q-axis current reference Iq_ref by using Equation (3).

$$\text{Iq\_ref} = \frac{\text{T\_ref}}{\Phi + (Ld - Lq) \cdot \text{Id\_ref}} \quad (3)$$

Herein, Φ is an armature interlinkage flux, Ld is an armature winding inductance of the d axis, and Lq is an armature winding inductance of the q axis. Herein, the output of the adder 23 is used as Id_ref in Equation (3). The q-axis current reference Iq_ref computed by the q-axis current reference calculator 21 is output to the q-axis current reference generating unit 24 and the switch 26.

The maximum efficiency controller 22 is a processing unit that computes the d-axis current reference Id_ref by using Equation (4).

$$Id\_ref = T\_ref \cdot K \cdot (-\sin \beta) \qquad (4)$$

Herein, K is a torque-current conversion factor and β is a current phase that uses, as a standard, a q-axis direction that is a direction vector perpendicular to a main magnetic flux (d axis) direction. The d-axis current reference Id_ref computed by the maximum efficiency controller 22 is output to the adder 23. The coefficients K, β, Φ, Ld, and Lq in Equations (3) and (4) are motor constants or control parameters and are input from the constant number switcher 11.

The adder 23 is a processing unit that adds the d-axis current reference Id_ref from the maximum efficiency controller 22 to the d-axis current reference correction value Id_refc. Herein, the d-axis current reference correction value Id_refc is a value that is calculated by the constant power controller 8 and is corrected by the d-axis current reference Id_ref in such a manner that the sizes of the voltage references (Vd_ref and Vq_ref) do not exceed the direct voltage. The d-axis current reference Id_ref computed by the adder 23 is output to the q-axis current reference calculator 21, the d-axis current reference generating unit 25, and the switch 27.

The q-axis current reference generating unit 24 and the d-axis current reference generating unit 25 are configured to respectively include therein a q-axis current model and a d-axis current model. The q-axis current reference generating unit 24 generates the q-axis current reference Iq_ref for a high-speed mode by using the q-axis current model for a high-speed mode and generates the q-axis current reference Iq_ref for a low-speed mode by using the q-axis current model for a low-speed mode. The generated two q-axis current references Iq_ref are output to the switch 26.

Similarly, the d-axis current reference generating unit 25 generates the d-axis current reference Id_ref for a high-speed mode by using the d-axis current model for a high-speed mode and generates the d-axis current reference Id_ref for a low-speed mode by using the d-axis current model for a low-speed mode. The generated two d-axis current references Id_ref are output to the switch 27.

In this way, the generated q-axis current references Iq_ref are output to the switch 26 and the generated d-axis current references Id_ref are output to the switch 27. The switches 26 and 27 respectively select the q-axis current reference Iq_ref and the d-axis current reference Id_ref in accordance with the output switching signal from the signal converter 13. More specifically, the switches 26 and 27 respectively select the output of the q-axis current reference calculator 21 and the output of the adder 23 if the output switching signal is "0", respectively select references generated by using the q-axis current model and the d-axis current model for a high-speed mode if it is "1", and respectively select references generated by using the q-axis current model and the d-axis current model for a low-speed mode if it is "2". The selected references are again output to the current controller 3 and the voltage FF calculator 12 as the q-axis current reference Iq_ref and the d-axis current reference Id_ref.

Although it is not illustrated, if the current reference calculator 2 has a configuration that the value of the output switching signal is input into the q-axis current reference generating unit 24 and the d-axis current reference generating unit 25, it is only necessary that the q-axis current reference generating unit 24 and the d-axis current reference generating unit 25 respectively generate the q-axis current reference Iq_ref and the d-axis current reference Id_ref corresponding to one of the low-speed mode and the high-speed mode.

Figure 8A:
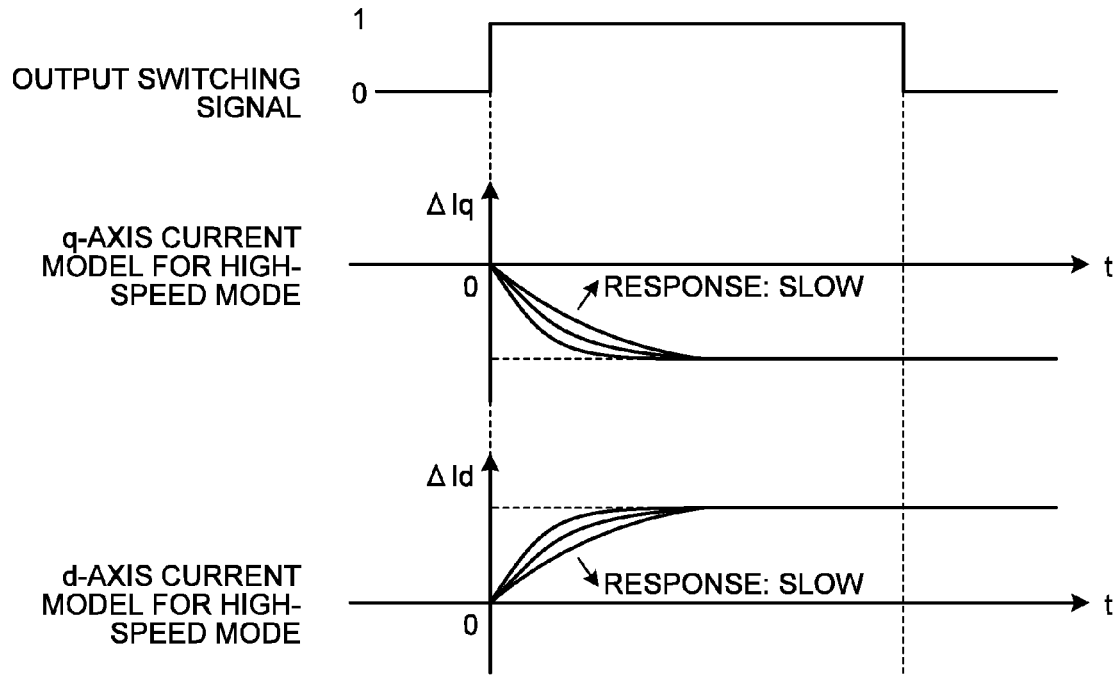
FIG. 8A is a diagram illustrating an example of a current model for a high-speed mode.
Figure 8B:
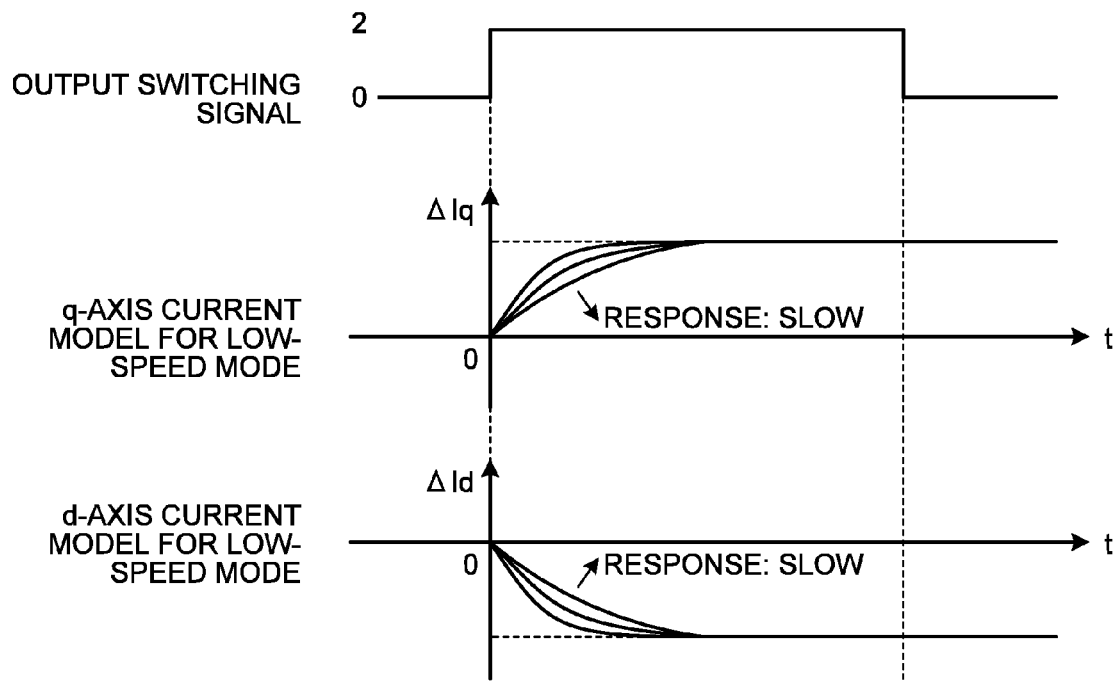
FIG. 8B is a diagram illustrating an example of a current model for a low-speed mode.

Next, the current models included in the q-axis current reference generating unit 24 and the d-axis current reference generating unit 25 are explained with reference to FIGS. 8A and 8B. FIG. 8A is an example of current models (q-axis current model and d-axis current model) for a high-speed mode. FIG. 8B is an example of current models (q-axis current model and d-axis current model) for a low-speed mode. Herein, a horizontal axis indicates a time "t" and a vertical axis indicates change amounts (ΔIq and ΔId) of a current reference.

Herein, the q-axis current model and the d-axis current model are obtained by modeling the changes in the q-axis current and the d-axis current caused by the difference of motor constants and control parameters accompanied with them in a low-speed mode and a high-speed mode assuming that the torque reference T_ref is constant.

In other words, the q-axis current model and the d-axis current model are obtained by modeling the changes in the values of the current references (Iq_ref, Id_ref) caused by winding switching to also include a response by the current controller 3 even if a load condition is constant. That is to say, the q-axis current model and the d-axis current model are obtained by modeling the q-axis current feedback value Iq_fb and the d-axis current feedback value Id_fb after winding switching. Further specifically, it is configured that the current models have therein a difference (namely, change amount of current reference) between a current reference before winding switching and a current reference after winding switching and the q-axis current reference generating unit 24 and the d-axis current reference generating unit 25 add the change amount of the current reference to the current reference before winding switching and output the result.

As illustrated in FIGS. 8A and 8B, it is configured that the q-axis current model and the d-axis current model are constituted by a plurality of models that have functions that use gain set values in the q-axis current controller 33 and the d-axis current controller 34 as parameters. The current models may store illustrated characteristics as a function similarly to a constant power model or may store them as a numeric table or the other format.

When current models in the q-axis current reference generating unit 24 and the d-axis current reference generating unit 25 are simply configured, the q-axis current reference and the d-axis current reference may be generated by interpolation approximation that uses a plurality of current models.

Herein, it has been explained that a current model corresponding to the change amount (ΔIq, ΔId) of the current reference is selected. However, the present embodiment is not limited to this. For example, it may be configured that a current model that uses the sizes of a current reference before winding switching and a current reference after winding switching as parameters is stored.

In this way, the q-axis current reference Iq_ref generated to be identical to the q-axis current feedback value Iq_fb and the d-axis current reference Id_ref generated to be identical to the d-axis current feedback value Id_fb are output until a predetermined time passes from an actual winding switching timing.

As a result, the current references (Iq_ref, Id_ref) and the current feedback values (Iq_fb, Id_fb) output to the subtractors 31 and 32 of the current controller 3 are substantially identical to each other. Therefore, because the output values from the subtractors 31 and 32 are extremely small, the influence can be minimized even if the outputs from the q-axis current controller 33 and the d-axis current controller 34 are not used at a winding switching timing. In other words, even if the outputs from the q-axis current controller 33 and the d-axis current controller 34 are not used at the winding switching timing, the AC motor 40 can be driven like the current controller 3 is operated.

As described above, because the voltage FF calculator 12 calculates the voltage feed-forward values (Vd_ff, Vq_ff) by using the current references (Iq_ref, Id_ref) that do not include a vibrational component during winding switching, an influence accompanied with winding switching can be reduced.

Operation Timing of Each Switch

Next, an operation timing of each switch that is used for the explanation will be explained. The switch 87 of the constant power controller 8 illustrated in FIG. 4, the switches 35 and 36 of the current controller 3 illustrated in FIG. 6, and the switches 26 and 27 of the current reference calculator 2 illustrated in FIG. 7 are synchronously operated. In other words, the output switching signal is input into the switches 26, 27, 35, 36, and 87 at the same timing, and the switches 26, 27, 35, 36, and 87 are operated at the same timing in accordance with the output switching signal.

A predetermined time for which the signal converter 13 maintains the output switching signal "1" or "2" may be generated as different times for the constant power controller 8, the current controller 3, and the current reference calculator 2.

For example, a predetermined time for which the output switching signal to the current reference calculator 2 is maintained may be set to be longer than a time for which the output switching signal to the current controller 3 is maintained. This reason is that the current references (Iq_ref, Id_ref) identical to the current feedback values (Iq_fb, Id_fb) may be output for only the time for which the current controller 3 does not use the outputs of the q-axis current controller 33 and the d-axis current controller 34.

A predetermined time for which the output switching signal to the constant power controller 8 is maintained may be determined by using a time to stabilize the change of the d-axis current by winding switching as a standard. In this case, this predetermined time tents to be longer than the predetermined time for which the output switching signal to the current reference calculator 2 or the current controller 3 is maintained.

Because the inverter device 20 and the drive system 100 according to the present embodiment are configured as described above, they have the following effects.

In the present embodiment, because the constant power controller 8 generates the d-axis current reference correction value and outputs it for a predetermined time by using the constant power model determined by the torque reference and the direct voltage at the output switching timing determined based on the output switching signal from the signal converter 13, an influence by winding switching can be reduced.

Moreover, in the present embodiment, because the current controller 3 sets the d-axis voltage feed-forward value as the d-axis voltage reference and sets the q-axis voltage feed-forward value as the q-axis voltage reference at the output switching timing determined based on the output switching signal from the signal converter 13, the increase of the resolution time of transient phenomena by winding switching can be more surely prevented.

Moreover, in the present embodiment, because the current reference calculator 2 generates the q-axis current reference and the d-axis current reference and outputs them for a predetermined time by using the current model obtained by modeling the change of the q-axis current accompanied with winding switching and the current model obtained by modeling the change of the d-axis current accompanied with winding switching at the output switching timing determined based on the output switching signal from the signal converter 13, an influence that the current feedback control is not performed during winding switching can be minimized.

In the embodiment, it has been explained that the AC motor 40 is controlled on the basis of the torque reference. However, the embodiment is not limited to this. The inverter device 20 can control the AC motor 40 on the basis of a speed reference that indicates the rotational speed of the AC motor 40.

In this case, the inverter device 20 generates the current references (Id_ref and Iq_ref), the voltage references (Vu_ref, Vv_ref, Vw_ref), and the like on the basis of the speed reference. Herein, the speed reference may be input from the outside. Alternatively, the inverter device 20 may include a speed reference generator that generates the speed reference.

Moreover, in the embodiment, it has been explained that the influence accompanied with winding switching is more surely reduced by resourcefully devising the configurations of the constant power controller 8, the current controller 3, and the current reference calculator 2. However, the inverter device may be configured by resourcefully devising only the configuration of the constant power controller 8. In other words, the inverter device may be configured to include, for example, a current controller that does not include the switches 35 and 36 and a current reference calculator that does not include the d-axis current reference correction value generating unit 86 and the switch 87.

Moreover, in the present embodiment, it has been explained that the winding switching section 60 has the configuration illustrated in FIG. 3. However, the configuration of the winding switching section 60 is not limited to the configuration illustrated in FIG. 3. For example, the winding switching section 60 may have the configuration illustrated in FIGS. 2 to 5 of Japanese Patent No. 3948009, or may have the configuration disclosed in Japanese Patent No. 2742800 or Japanese Patent No. 3037471. Alternatively, the winding switching section 60 may have the other configuration.

Moreover, in the present embodiment, it has been explained that the drive system 100 has the configuration that the winding switching section 60 and the inverter device 20 are separated as an example. However, the drive system 100 may include an inverter device that has the winding switching section 60 built-in. Furthermore, the drive system 100 may have the configuration that the AC motor 40 has the winding switching section 60 built-in. When this configuration is employed, an installation area and a wiring figure can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverter device comprising:
   a voltage supply unit that is connected to one end of an armature winding of an AC motor corresponding to each phase and supplies a variable voltage for driving the AC motor to the AC motor;

a winding switching signal generator that is connected to each of another end and a halfway portion of the armature winding and outputs a winding switching signal to a winding switching section that changes connection of the armature winding;

an output switching signal generator that generates an output switching signal based on the winding switching signal, the output switching signal including a first signal indicating a switching timing from a low-speed mode to a high-speed mode, a second signal indicating a switching timing from the high-speed mode to the low-speed mode, and a third signal indicating timing other than the switching timings; and a constant power controller that outputs one of d-axis current reference correction values in accordance with one of the first to third signals without using feedback values that are detected values, wherein the constant power controller:

computes and outputs, when the output switching signal is the third signal and when a value of a voltage reference to the AC motor exceeds a predetermined threshold value, the d-axis current reference correction value on the basis of the value of the voltage reference and the predetermined threshold value; and generates, when the output switching signal is the first signal or the second signal, the d-axis current reference correction value by using constant power models for the low-speed and high-speed modes determined by a torque reference or a speed reference and a supplied direct voltage and outputs the d-axis current reference correction value for a predetermined time.

2. The inverter device according to claim 1, wherein the constant power controller selects a constant power model close to an operating condition at the output switching timing from a plurality of constant power models corresponding to a combination of the torque reference or the speed reference and the direct voltage and generates the d-axis current reference correction value by using the selected constant power model.

3. The inverter device according to claim 2, further comprising:

a voltage feed-forward calculator that computes a d-axis voltage feed-forward value and a q-axis voltage feed-forward value on the basis of the d-axis current reference, a q-axis current reference, and a rotational speed of the AC motor; and a current controller generates a d-axis voltage reference on the basis of the d-axis voltage feed-forward value and a result of a feedback control using the d-axis current reference and a d-axis current feedback value and generates a q-axis voltage reference on the basis of the q-axis voltage feed-forward value and a result of a feedback control using the q-axis current reference and a q-axis current feedback value, wherein the current controller outputs the d-axis voltage feed-forward value as the d-axis voltage reference and outputs the q-axis voltage feed-forward value as the q-axis voltage reference at the output switching timing determined based on the winding switching signal.

4. The inverter device according to claim 3, wherein the current controller initializes an integral element included in the feedback control at the output switching timing determined based on the winding switching signal.

5. The inverter device according to claim 2, further comprising a current reference calculator that generates a d-axis current reference and a q-axis current reference on the basis of the torque reference or the speed reference and the d-axis current reference correction value, wherein the current reference calculator generates the q-axis current reference by using q-axis current models for low-speed and high-speed modes obtained by modeling a change of a q-axis current caused by winding switching and outputs the q-axis current reference for a predetermined time and generates the d-axis current reference by using d-axis current models for low-speed and high-speed modes obtained by modeling a change of a d-axis current caused by winding switching and outputs the d-axis current reference for a predetermined time, at the output switching timing determined based on the winding switching signal.

6. The inverter device according to claim 5, wherein the current reference calculator selects one of the q-axis current models for low-speed and high-speed modes and one of the d-axis current models for low-speed and high-speed modes by using switches.

7. The inverter device according to claim 1, further comprising:

a voltage feed-forward calculator that computes a d-axis voltage feed-forward value and a q-axis voltage feed-forward value on the basis of the d-axis current reference, a q-axis current reference, and a rotational speed of the AC motor; and a current controller generates a d-axis voltage reference on the basis of the d-axis voltage feed-forward value and a result of a feedback control using the d-axis current reference and a d-axis current feedback value and generates a q-axis voltage reference on the basis of the q-axis voltage feed-forward value and a result of a feedback control using the q-axis current reference and a q-axis current feedback value, wherein the current controller outputs the d-axis voltage feed-forward value as the d-axis voltage reference and outputs the q-axis voltage feed-forward value as the q-axis voltage reference at the output switching timing determined based on the winding switching signal.

8. The inverter device according to claim 7, wherein the current controller initializes an integral element included in the feedback control at the output switching timing determined based on the winding switching signal.

9. The inverter device according to claim 8, further comprising a current reference calculator that generates a d-axis current reference and a q-axis current reference on the basis of the torque reference or the speed reference and the d-axis current reference correction value, wherein the current reference calculator generates the q-axis current reference by using q-axis current models for low-speed and high-speed modes obtained by modeling it change of a q-axis current caused by winding switching and outputs the q-axis current reference for a predetermined time and generates the d-axis current reference by using d-axis current models for low-speed and high-speed modes obtained by modeling a change of a d-axis current caused by winding switching and outputs the d-axis current reference for a predetermined time, at the output switching timing determined based on the winding switching signal.

10. The inverter device according to claim 9, wherein the current reference calculator selects one of the q-axis current models for low-speed and high-speed modes and one of the d-axis current models for low-speed, and high-speed modes by using switches.

11. The inverter device according to claim 7, further comprising a current reference calculator that generates a d-axis current reference and a q-axis current reference on the basis of the torque reference or the speed reference and the d-axis current reference correction value, wherein the current reference calculator generates the q-axis current reference by using q-axis current models for low-speed and high-speed modes obtained by modeling a change of a q-axis current caused by winding switching and outputs the q-axis current reference for a predetermined time and generates the d-axis current reference by using d-axis current models for low-speed and high-speed modes obtained by modeling a change of a d-axis current caused by winding switching and outputs the d-axis current reference for a predetermined time, at the output switching timing determined based on the winding switching signal.

12. The inverter device according to claim 11, wherein the current reference calculator selects one of the q-axis current models for low-speed and high-speed modes and one of the d-axis current models for low-speed and high-speed modes by using switches.

13. The inverter device according to claim 1, further comprising a current reference calculator that generates a d-axis current reference and a q-axis current reference on the basis of the torque reference or the speed reference and the d-axis current reference correction value, wherein the current reference calculator generates the q-axis current reference by using q-axis current models for low-speed and high-speed modes obtained by modeling a change of a q-axis current caused by winding switching and outputs the q-axis current reference for a predetermined time and generates the d-axis current reference by using d-axis current models for low-speed and high-speed modes obtained by modeling a change of a d-axis current caused by winding switching and outputs the d-axis current reference for a predetermined time, at the output switching timing determined based on the winding switching signal.

14. The inverter device according to claim 13, wherein the current reference calculator selects one of the q-axis current models for low-speed and high-speed modes and one of the d-axis current models for low-speed and high-speed modes by using switches.

15. The inverter device according to claim 1, further comprising a signal converter that converts the winding switching signal from the winding switching signal generator into the output switching signal.

16. The inverter device according to claim 1, wherein the constant power controller includes a switch that selects one of the d-axis current reference correction values in accordance with the output switching signal.

17. The inverter device according to claim 1, wherein the constant power controller generates the d-axis current reference correction value in response to the winding switching signal from the winding switching signal generator, the output switching signal from the output switching signal generator, a detected value of a direct voltage input to the inverter device, and a d-axis voltage reference output from a current controller based on a d-axis voltage feed-forward value.

18. The inverter device according to claim 1, further comprising:

a voltage detector that detects a direct voltage input to the inverter device;

a voltage feed-forward calculator that computes a d-axis voltage feed-forward value and a q-axis voltage feed-forward value on the basis of a d-axis current reference, a q-axis current reference, and a rotational speed of the AC motor; and a current controller that outputs the d-axis voltage feed-forward value as a d-axis voltage reference and outputs the q-axis voltage feed-forward value as a q-axis voltage reference at an output switching timing determined based on the winding switching signal, wherein the constant power controller generates the d-axis current reference correction value in response to the winding switching signal from the winding switching signal generator, the output switching signal from the output switching signal generator, the direct voltage from the voltage detector, and the d-axis voltage reference from the current controller.

19. An electric motor drive system comprising:

a direct voltage source;

an AC motor; and an inverter device that is connected to one end of an armature winding of the AC motor corresponding to each phase, the inverter device comprising:

a winding switching signal generator that is connected to each of another end and a halfway portion of the armature winding and outputs a winding switching signal to a winding switching section that changes connection of the armature winding;

an output switching signal generator that generates an output switching signal based on the winding switching signal, the output switching signal including a first signal indicating a switching timing from a low-speed mode to a high-speed mode, a second signal indicating a switching timing from the high-speed mode to the low-speed mode, and a third signal indicating timing other than the switching timings; and a constant power controller that outputs one of d-axis current reference correction values in accordance with one of the first to third signals without using feedback values that are detected values, wherein the constant power controller:

computes and outputs, when the output switching signal is the third signal and when a value of a voltage reference to the AC motor exceeds a predetermined threshold value, the d-axis current reference correction value on the basis of the value of the voltage reference and the predetermined threshold value; and generates, when the output switching signal is the first signal or the second signal, the d-axis current reference correction value by using constant power models for the low-speed and high-speed modes determined by a torque reference or a speed reference and a supplied direct voltage and outputs the d-axis current reference correction value for a predetermined time.

20. The electric motor drive system according to claim 19, wherein the inverter device further comprises a signal converter that converts the winding switching signal from the winding switching signal generator into the output switching signal.

21. The electric motor drive system according to claim 19, wherein the constant power controller includes a switch that selects one of the d-axis current reference correction values in accordance with the output switching signal.

22. The electric motor drive system according to claim 19, wherein the constant power controller generates the d-axis current reference correction value in response to the winding switching signal from the winding switching signal generator, the output switching signal from the output switching signal generator, a detected value of a direct voltage input to the inverter device by the direct voltage source, and a d-axis voltage reference output from a current controller based on a d-axis voltage feed-forward value.

23. The electric motor drive system according to claim 19, further comprising:
a voltage detector that detects a direct voltage input to the inverter device by the direct voltage source;
a voltage feed-forward calculator that computes a d-axis voltage feed-forward value and a q-axis voltage feed-forward value on the basis of a d-axis current reference, a q-axis current reference, and a rotational speed of the AC motor; and
a current controller that outputs the d-axis voltage feed-forward value as a d-axis voltage reference and outputs the q-axis voltage feed-forward value as a q-axis voltage reference at an output switching timing determined based on the winding switching signal,
wherein the constant power controller generates the d-axis current reference correction value in response to the winding switching signal from the winding switching signal generator, the output switching signal from the output switching signal generator, the direct voltage from the voltage detector, and the d-axis voltage reference front the current controller.

24. An inverter device comprising:
a voltage supply means that is connected to one end of an armature winding of an AC motor corresponding to each phase and supplies a variable voltage for driving the AC motor the AC motor;
a winding switching signal generating means that is connected to each of another end and a halfway portion of the armature winding and outputs a winding switching signal to a winding switching section that changes connection of the armature winding;
an output switching signal generating means for generating an output switching signal based on the winding switching signal, the output switching signal including a first signal indicating a switching timing from a low-speed mode to a high-speed mode, a second signal indicating a switching timing from the high-speed mode to the low-speed mode, and a third signal indicating timing other than the switching timings; and
a constant power control means that outputs one of d-axis current reference correction values in accordance with one of the first to third signals without using feedback values that are detected values, wherein
the constant power control means:
computes and outputs, when the output switching signal is the third signal and when a value of a voltage reference to the AC motor exceeds a predetermined threshold value, the d-axis current reference correction value on the basis of the value of the voltage reference and the predetermined threshold value; and
generates, when the output switching signal is the first signal or the second signal, the d-axis current reference correction value by using constant power models for the low-speed and high-speed modes determined by a torque reference or a speed reference and a supplied direct voltage and outputs the d-axis current reference correction value for a predetermined time.

25. The inverter device according to claim 24, further comprising a signal conversion means that converts the winding switching signal from the winding switching signal generating means into the output switching signal.

26. The inverter device according to claim 24, wherein the constant power control means includes a switch that selects one of the d-axis current reference correction values in accordance with the output switching signal.

27. The inverter device according to claim 24, wherein the constant power control means generates the d-axis current reference correction value in response to the winding switching signal from the winding switching signal generating means, the output switching signal from the output switching signal generating means, a detected value of a direct voltage input to the inverter device, and a d-axis voltage reference output from a current controller based on a d-axis voltage feed-forward value.

28. The inverter device according to claim 24, further comprising:
means for detecting a direct voltage input to the inverter device;
means for computing a d-axis voltage feed-forward value and a q-axis voltage feed-forward value on the basis of a d-axis current reference, a q-axis current reference, and a rotational speed of the AC motor; and
current control means that outputs the d-axis voltage feed-forward value as a d-axis voltage reference and outputs the q-axis voltage feed-forward value as a q-axis voltage reference at an output switching timing determined based on the winding switching signal,
wherein the constant power control means generates the d-axis current reference correction value in response to the winding switching signal from the winding switching signal generating means, the output switching signal from the output switching signal generating means, the direct voltage from the means for detecting, and the d-axis voltage reference from the current control means.

* * * * *